United States Patent

[11] 3,598,965

[72] Inventors Sizuya Ano;
Masanori Nagata; Tadao Morita, all of Kyoto, Japan
[21] Appl. No. 690,903
[22] Filed Dec. 15, 1967
[45] Patented Aug. 10, 1971
[73] Assignee Omron Tateisi Electronics Co.
Kyoto, Japan
[32] Priority Dec. 23, 1966
[33] Japan
[31] 41-84215

[54] METHOD OF AND APPARATUS FOR AUTOMATICALLY EXAMINING RAILWAY TICKETS OR THE LIKE

5 Claims, 7 Drawing Figs.

[52] U.S. Cl. 235/61.7 R, 194/4 R, 340/149 A
[51] Int. Cl. G06k 17/00, G07f 7/02, H04a 9/00
[50] Field of Search 235/61.7 B, 61.7; 340/149 A, 183; 194/4

[56] References Cited
UNITED STATES PATENTS

| | | | |
|---|---|---|---|
| 3,221,304 | 11/1965 | Enikeieff et al. | 340/149 A |
| 3,356,021 | 12/1967 | May et al. | 235/61.7 (B) UX |
| 3,091,756 | 5/1963 | Lowman | 340/183 |
| 3,355,576 | 11/1967 | Childers et al. | 235/61.7 (B) |

*Primary Examiner*—Maynard R. Wilbur
*Assistant Examiner*—Thomas J. Sloyan
*Attorney*—Christensen, Sanborn & Matthews

ABSTRACT: To permit a passenger to choose his range of journey on a transportation system, a ticket for use therefor includes two recording areas, one having an identification number and the other providing for recording of the station at which the ticket is last used. The passenger inserts the ticket into an entrance gate wherein a sensor actuates a first shift register which in turn steps gating circuitry to apply a predetermined station number to the second area in synchronism with a plurality of synchronizing marks thereon. The passenger is then allowed to retrieve his ticket and pass through the gate. When he has completed his journey, he inserts the ticket into an exit gate wherein a sensor actuates a second shift register which transfers, in synchronism with the synchronizing marks, the recorded station number to storage circuitry. The exit gate then transmits an identification signal to a common controller which also receives similar identification signals from other stations. The controller includes a third shift register which is stepped by a pulse generator. The outputs of the third shift register are compared with the plurality of identification signals; when a comparison is made, the common controller sends a recognition signal to the particular station, stops the pulse generator and actuates a recorder. The recorder then sequentially issues four signals which are combined with the identification and recognition signals to step a fourth shift register at the exit gate. The outputs from the fourth shift register in turn interrogate the storage circuitry containing the recorded station number, gating circuitry which reads the identification number off the ticket, and gating circuitry including the exit station number. These information signals from the storage and gating circuitry are sequentially recorded, and the fourth signal therefrom resets the fourth shift register, restarts the pulse generator and releases a locking mechanism at the exit gate to permit the passenger to pass therethrough.

INVENTORS
SIZUYA ANO
MASANORI NAGATA
TADAO MORITA
BY
Christensen, Sanborn & Matthews
ATTORNEYS

INVENTORS
SIZUYA ANO
MASANORI NAGATA
TADAO MORITA
BY
ATTORNEYS

PATENTED AUG 10 1971

3,598,965

SHEET 3 OF 4

INVENTOR
SIZUYA ANO
MASANORI NAGATA
TADAO MORITA
BY
Christensen, Sanborn, Matthews
ATTORNEYS INVENTORS
SIZUYA ANO
MASANORI NAGATA
TADAO MORITA
BY Christensen, Sanborn & Matthews
ATTORNEYS

METHOD OF AND APPARATUS FOR AUTOMATICALLY EXAMINING RAILWAY TICKETS OR THE LIKE

This invention relates to a method of and apparatus for automatically examining railway tickets or the like.

There is known an automatic ticket-examining system, wherein a ticket issued to a passenger has a coded information recorded thereon, such as the name of the station where it was issued and the name of a destination or a range of journey the ticket holder is entitled to. So long as the ticket holder gets off the train at a station within the range of journey, he is permitted to pass through the exit gate of the station, where the ticket is collected so as not to be used again. A commutation ticket has recorded thereon a coded information such as the identification number thereof, the period of availability and the range of journey. If the ticket is used at a station outside the predetermined range of journey, passage through the gate of the station is blocked. In such prior art system, the ticket is usable only within the predetermined range of journey. This certainly is inconvenient.

Accordingly, the primary object of the invention is to make it possible for the owner of a ticket to freely choose his range of journey, that is, to get on and off a train or the like at any of the stations throughout a railway line.

Another object of the invention is to provide an automatic ticket-examining system in which a ticket having an identification code recorded thereon enables its holder to pass through a gate at any of the stations throughout a line.

A further object of the invention is to provide an automatic ticket examining system in which a ticket having an identification code is previously issued to a passenger, and in which when said ticket is used at a ticket gate for entrance, the name of the station where the ticket gate is installed is recorded on the ticket, so that when said ticket is again used at another ticket gate, the recorded name of the first station and the identification code of the ticket are read so as to be recorded together with the name of the station where said other ticket gate is as an information from which the fare between said two ticket gates can be calculated.

In accordance with the present invention, each ticket has an information recorded thereon by which to identify the ticket. Generally, such information is a coded number recorded on each ticket by means of, for example, magnetic recording. Each ticket has an area where when the ticket is used at an entrance gate at a station, the name of that station is recorded in accordance with a predetermined code. When this recording has been finished, passage through the gate is permitted. When the ticket is again used at an exit gate at a station, the name of the station that was previously recorded on the ticket at the entrance gate is read together with the identification number of the ticket, and the record of the name of the station is erased. A recorder is provided to record the identification number of the ticket used, the name of the station where the ticket was used for entrance and the name of the station where it was again used for exit. In addition to, or instead of, the names of the two stations, the recorder may record the fare for the trip made between the two stations.

The invention will be better understood from the following detailed description of a preferred embodiment thereof with reference to the accompanying drawings, wherein.

Figure 1:
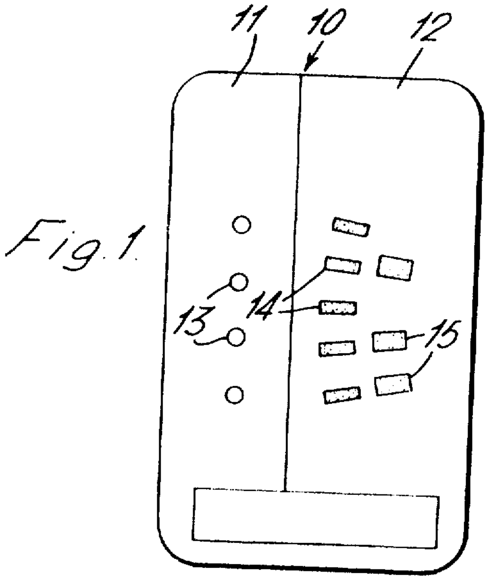
FIG. 1 is a top plan view of a ticket used in the system of the invention.

Referring in detail to FIG. 1, there is shown a ticket 10 having two recording areas 11 and 12. In the area 11, the identification number of the ticket or its owner is recorded, while in the other area 12 the name of the station where the ticket is used for entrance is to be recorded. The identification number may be recorded in the form, for example, punched holes 13 arranged in accordance with a predetermined code. The area 12 is coated with a suitable material that enables magnetic recording thereon. On the area 12 a plurality of magnetically recorded synchronizing marks 14 are arranged along a predetermined arc. In the illustrated embodiment, the number of the marks 14 is five as the bit number of the identification number code is four. Concentrically with the arcuate arrangement of the marks 14, code marks 15 expressing the name of a station where the ticket has been used are recorded in the manner to be described later and at such positions as to establish a synchronous relation to the marks 14.

Figure 2:
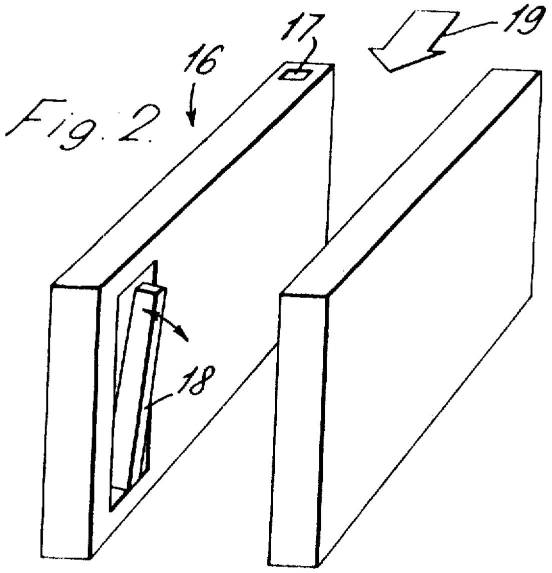
FIG. 2 is a somewhat schematic perspective view of a gate used in the system of the invention.

At each of the stations included in a line, there are installed at least a pair of ticket gates, one for entrance and the other for exit. As shown in FIG. 2, each ticket gate 16 is provided with a slot 17 into which a passenger is to insert his ticket and a barrier bar 18 controlled so as to open and close the gateway. Passengers are supposed to pass through the gate in the direction of an arrow 19. As they enter the gate, they insert a ticket into the slot 17 with a prescribed edge thereof forward or downward, and after the ticket has been treated in the manner to be described later in detail, they pick it up and pass through the gate. If the ticket inserted is recognized as false or invalid, the barrier bar 18 is kept closed. The following description presupposes the genuineness and validity of the ticket inserted.

Figure 3:
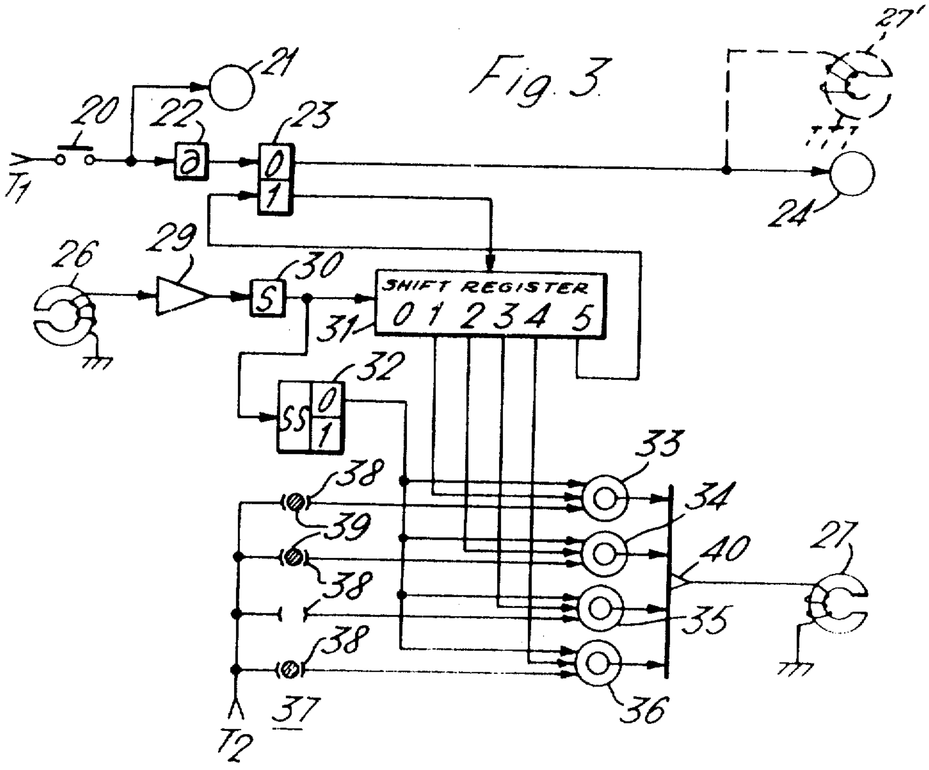
FIG. 3 is a block diagram of a recording control circuit provided in the gate of FIG. 2 used as an entrance gate.
Figure 4:
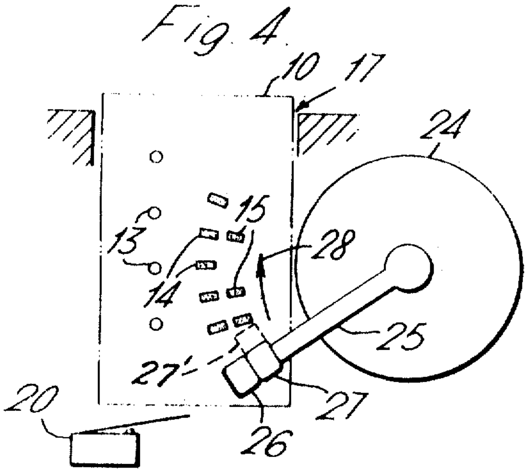
FIG. 4 is a schematic side view of a magnetic recorder provided in the entrance gate.

When a ticket has been inserted into a proper position in the slot 17, a switch 20 (FIG. 3) is closed, through which a source terminal Tl supplies electric energy to a solenoid 21, which operates to open the closed bar 18 to permit passage through the gate. The signal from the terminal Tl is also applied to a differentiator 22, the output from which sets a flip-flop 23. The set output from this flip-flop energizes a rotary solenoid 24. As shown in FIG. 4, the solenoid 24 includes a rotatable arm 25 having a magnetic reading head 26 and a magnetic recording head 27 so arranged that with a ticket properly positioned in the slot 17, as the arm 25 is rotated in the clockwise direction shown by an arrow 28, the head 26 scans the synchronizing marks 14 already recorded on the ticket and the head 27 traces an arcuate path along which the code marks 15 are to be recorded on the ticket.

Each time the head 26 detects one synchronizing mark, it applies one pulse to a Schmidt circuit 30 through an amplifier 29. The output pulses from the Schmidt circuit 30 make a shift register 31 to step forward, shifting its output from its terminal "0" through "5." The output from the Schmidt circuit 30 also triggers a one-shot multivibrator 32. Therefore, each time the heads 26 detects one synchronizing mark on the ticket, the multivibrator 32 produces one output pulse having a predetermined pulse width, which is applied as one input to AND elements 33—36. The outputs at the terminals "1"—"5" of the counter 31 are applied as a second input to the AND elements 33—36, respectively. A pinboard 37 is provided having a plurality, say, for pinholes 38, through which a signal at a terminal T2 is applied as a third input to the AND elements 33—36. The pinholes 38 are used to set therein the coded name of the station where the gate is installed by inserting a pin thereinto in accordance with a predetermined code. In the illustrated embodiment, a pin 39 is inserted into those three of the four pinholes which are connected to the AND elements 33, 34 and 36. As a result, as the reading head 26 detects one of the synchronizing marks 14 after another, the AND elements 33, 34 and 36 produce an output, but the AND element 35 does not. The output condition of the four AND elements 33—36 may sequentially be expressed as "1" "1" "0" "1." These signals are successively applied through an OR element 40 to the recording head 27 so that as the arm 25 is rotated clockwise, these signals expressing the coded name of the station are recoded on the area 12 of the ticket as the marks 15 arranged in a synchronous relation to the marks 14, as shown in FIG. 4. When the head 26 has detected the last of the synchronizing marks 14, the shift register 31 produces an output at the last terminal "5," which resets the flip-flop 23 to remove its set output. As a result, the solenoid 24 is deenergized so that the arm 25 is rotated counterclockwise back to its original position. At the same time, the reset output from the flip-flop 23 resets the shift register 31.

When the recording of the name of the station on the ticket has thus been completed, a suitable mechanism, not shown, pushes the inserted ticket upward from the slot 17 so that the passenger may pick it up and pass through the gate.

When the ticket has been pushed upward in the slot 17, the switch 20 is restored, so that the solenoid 21 would be deenergized. In practice, however, the arrangement is such that after the restoration of the switch 20 the solenoid 21 is kept energized to keep the bar 18 open until a suitable electrical or optical device detects that the passenger has passed through the gate, whereupon the solenoid 21 is deenergized.

Figure 5:
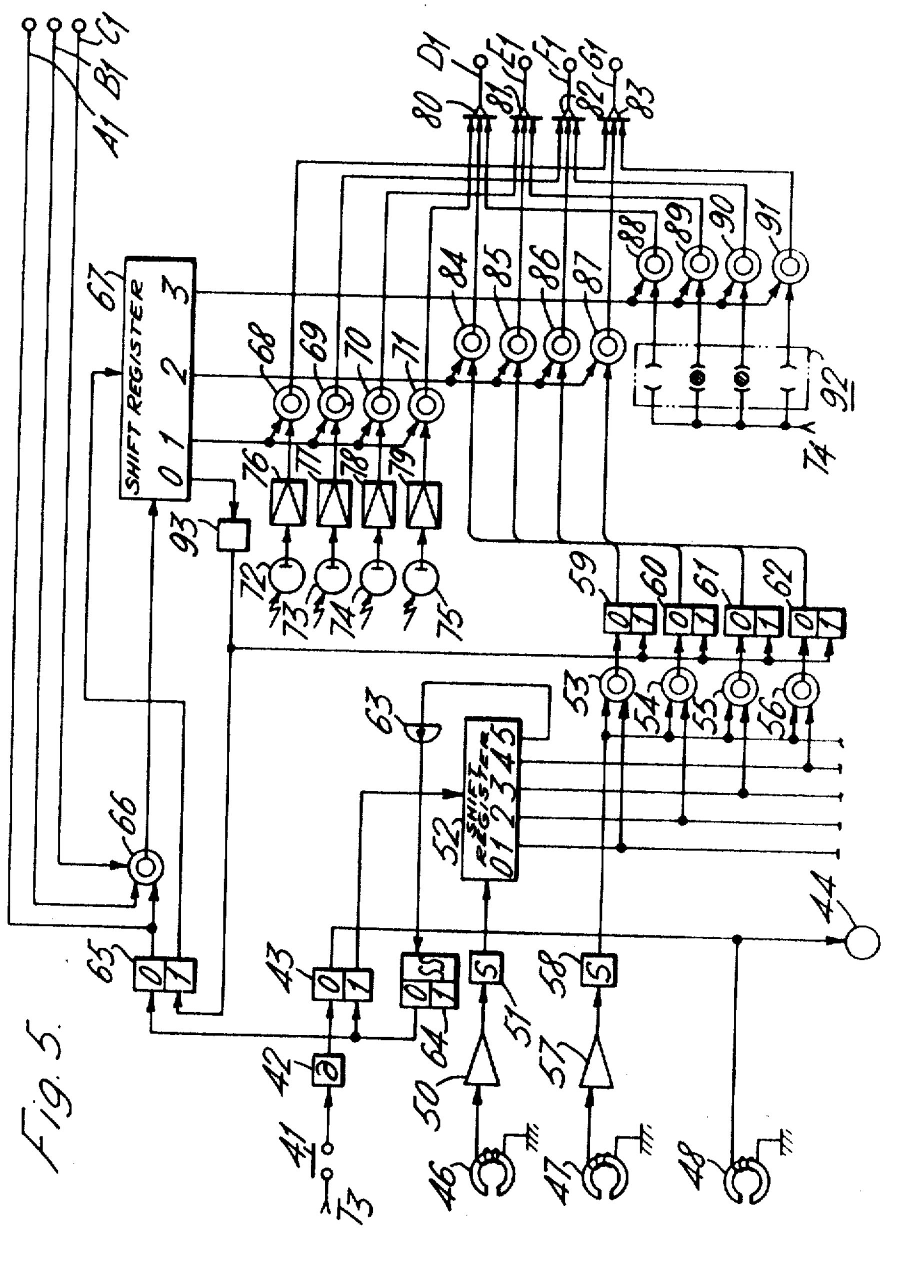
FIG. 5 is a block diagram of a reading and erasing control circuit provided in the gate of FIG. 2 used as an exit gate.
Figure 6:
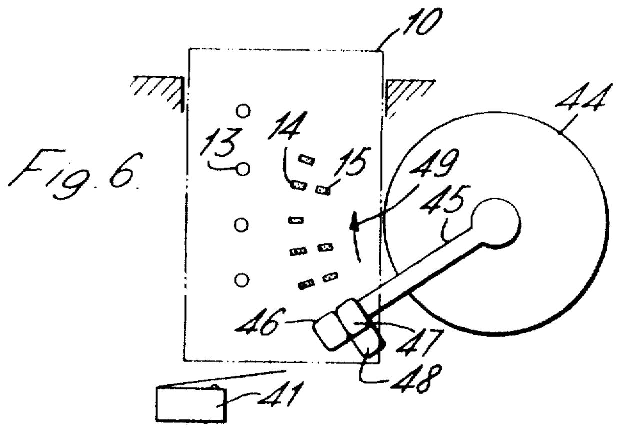
FIG. 6 is a schematic side view of a magnetic recorder provided in the exit gate.

The gate 16 functions as an exit gate if it is provided with the circuit arrangement shown in FIGS. 5 and 6. When a passenger passes through the exit gate, he inserts his ticket into the slot of the gate. The ticket has recorded thereon the code marks 15 expressing the name of the station where this ticket was previously used for entrance. When the ticket has been inserted into a proper position in the slot, a switch 41 is closed through which a signal on a terminal T3 is applied to a differentiator 42, the output from which sets a flip-flop 43. The set output from this flip-flop energizes a rotary solenoid 44. When energized, the solenoid 44 rotates an arm 45 clockwise as indicated by an arrow 49. The arm 45 is provided with a first head 46 for reading the synchronizing marks 14 on the ticket, a second head 47 for reading the code marks 15 expressing the name of the station where the ticket was previously used for entrance, and a third head 48 for erasing the code marks 15 as they have been read by the preceding head 47.

Each timer the reading head 46 reads one of the synchronizing marks 14 after another, it applies one pulse to a Schmidt circuit 51 through an amplifier 50. The output pulses from the Schmidt circuit 51 are successively applied to a shift register 52 to cause the same to shift its output from its terminal "0" through "5." The outputs at the terminals "1" through "4" of the counter are applied as one input to AND elements 53—56, respectively. Each time the second reading head 47 reads one of the code marks 15 after another, it applies one pulse as another input to the AND elements 53—56 through an amplifier 57 and a Schmidt circuit 58. It will be easily seen that those of the AND elements 53—56 which receive two inputs simultaneously produce an output. Since the code marks 15 on the ticket and, consequently, the outputs from the Schmidt circuit 58 may be sequentially expressed as "1" " 1" "0" "1," and the outputs from the counter terminals "1" through "4" caused by the first four synchronizing marks 14 may sequentially be expressed as "1" "1" "1" "1," the AND elements 53, 54 and 56 produce an output while the AND element 55 produces no output. The outputs from the AND elements 53, 54 and 56 sets flip-flops 59, 60 and 62, respectively, while the AND element 55 applies no set input to a flip-flop 61. Thus, the coded name of the station has been memorized as the set output conditions of the flip-flops 59—62, that is, "1" "1" "0" 1." As the marks 15 are read by the head 47, they are erased by the following head 48 which has been energized by the set output from the flip-flop 43. When the first reading head 46 has read the last of the synchronizing marks 14, the shift register 52 produces an output at its last terminal "5." This output is applied to a timer 63, the output from which triggers a one-shot multivibrator 64 to cause the same to produce an output pulse having a predetermined pulse width. This output pulse resets the flip-flop 43 on the one hand and sets a flip-flop 65 on the other. The reset output from the flip-flop 43 resets the shift register 52, and the set output from the flip-flop 65 is applied as one input signal to an AND element 66 on the one hand and through a line A1 to a common controller (FIG. 7) on the other. The controller is so arranged as to receive similar signals from the exit gates at all the other stations under the control of the controller through corresponding lines A2, A3,—An, *n* expressing the number of the exit gates provided. When the signal on the line A1 is first applied to the controller, the controller applies an output signal to a second input terminal of the AND element 66 through a line B1. While the signals on the lines A1 and B1 are being simultaneously applied to the ANd element 66, a recorder 104 applies one pulse after another to a third input of the AND element through a line C1, as will be described later in detail. Each time one pulse is applied to the AND element 66 through the line C1, the AND element produces one output pulse to be applied to a shift register 67. As the counter receives input pulses, it steps forward from "0" through "1" and "2" to "3." That is, when the first pulse from the line C1 has been applied to the AND element 66, the shift register 67 shifts its output from the terminal "0" to "1." This output at t—e terminal "1" is applied as one input to each of AND elements 68—71. On the other hand, the outputs from photoelectric elements 72—75 are applied as the other input to the AND elements 68—71 through amplifiers 76—79, respectively. Therefor, AND elements 68—71 produce outputs which correspond to the outputs of the photoelectric elements 72—75. The outputs from the AND elements 68—71 appear on lines G1, F1, E1 and D1 through OR elements 83—80, respectively. Thus, the signals appearing on the lines G1—D1 when the first pulse has been applied to the AND element 66 through the line C1 express the coded number of the ticket inserted into the slot 17 of the gate 16.

The photoelectric elements 72—75 are provided in the slot of the exit gate for the purpose of detecting the punched holes 13 in the ticket expressing its coded identification number. When the ticket has been inserted into the previously mentioned proper position in the slot 17, it receives light from a light source, not shown. The light that passes through the punched holes in the ticket is projected onto those of the photoelectric elements 72—75 which correspond to the positions of the punched holes. In the illustrated embodiment, four photoelectric elements are provided, but as many of them may be provided as there are punched holes necessary to express the codes of the identification numbers of all the tickets that are issued.

When a second pulse is applied to the AND element 66 through the line C1, the output of the shift register 67 is shifted from the terminal "1" onto "2. " This output is applied as one input to AND elements 84—87. The set outputs from the flip-flops 59—62 are applied as the other input to the AND elements 84—87, respectively, the outputs from which appear on the lines D1—G1 through the OR elements 80—83, respectively. In the illustrated embodiment, the flip-flops 59, 60 and 62 produce a set output so that the AND elements 84, 85 and 87 produces an output, while the remaining one 86 does not. Thus, the signals appearing on the lines D1—G1 when the second pulse has been applied through the line C1 express the coded name of the station where the ticket was used for entrance, as read from the record on the ticket.

When a third pulse has been applied to the AND element 66 through the line C1, the shift register 67 shifts its output from the terminal "2" onto "3. " This output at the terminal "3" is applied as one input to AND elements 88—91. A pinboard 92 similar to the pinboard 37 in FIG. 3 is provided for setting therein the coded name of the station where the exit gate is installed. The pinboard 92 has four pinholes through which a signal at a terminal T4 may be applied as the other input to the AND elements 88—91. In the illustrated embodiment, a pin is inserted into those two of the pinholes which are connected to the AND elements 89 and 90. Consequently, signals appear on the lines E1 and F1, expressing the coded name of the station where the ticket is used for exit.

When a fourth pulse is applied to the AND element 66 through the line C1, the output of the shift register 67 is shifted from the terminal "3" back to "0." This output is applied as a reset input to the flip-flop 65 through a differentiator 93, the reset output from which resets the shift register 67. Thus, the signals appearing on the lines D1—G1 as the counter output is shifted successively express the identification number of the ticket, the name of the station where the ticket was used for entrance and the name of the station where the ticket was again used for exit.

Figure 7:
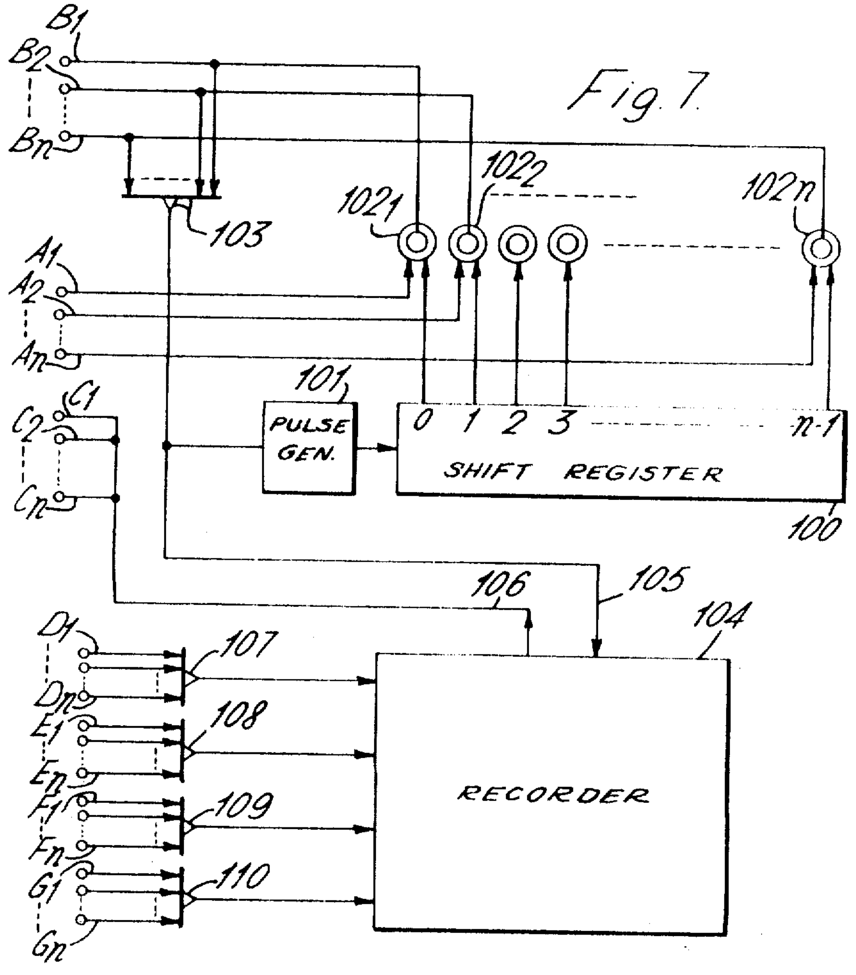
FIG. 7 is a block diagram of a recorder and a recording controller used in the system of the invention.

FIG. 7 shows a recorder and a common controller for enabling the recorder to record the informations on the tickets from all the exit gates included in the system. To this end, the common controller includes a shift register 100 having *n* output terminals "0,"—"*n*-1." The number of the output terminals corresponds to the number of the exit gates provided. A pulse generator 101 normally applies pulses to the shift register 100 to cause the same to step forward incessantly. AND elements $102_1$, $102_2$,—$102_n$ have their respective one inputs connected to the lines A1—A*n* leading from the exit gates and the other inputs connected to the output terminals "0"—"*n*-1" of the shift register 100, respectively.

When a signal on one of the lines A1—A*n* coincides with the signal at one of the output terminals of the shift register 100, that one of the AND elements $102_1$—$102_n$ which receives the two input signals at the same time produces an output, which is applied through an OR element 103 to the generator 101 to stop the production of pulses therefrom. To take an example, when a signal on the line A1 coincides with the output at the counter terminal "0," the AND element $102_1$ produces an output, which stops the generator 101, so that the shift register 100 stops with the output being maintained at its terminal "0."

The outputs of the AND elements $102_1$—$102_n$ are also connected to the lines B1—B*n* connected to all the exit gates. Therefore, the output from the AND element $102_1$ appears on the line B1 so as to be applied to the AND element 66 (FIG. 5). At the same time, the output from the OR element 103 is applied to the recorder 104, such as a tape puncher. When the first output from the OR element 103 is applied to the puncher 104, it produces an output pulse, which appears as the previously mentioned first pulse on all the lines C1—C*n*.

When this first pulse appears on the line C1 (and C2—C*n*), the signals on the line D1—G1 caused by the coded identification number of the ticket inserted are applied through OR elements 107—110 to the recorder 104 to operate the same to record the ticket number. To the OR elements 107—110 there are also connected similar lines D2—D*n*, E2—E*n*, F2—F*n* and G2—G*n* from the other exit gates. When the recording of the ticket number has been completed, the recorder produces a second output on the lines C1—C*n*. As previously mentioned, when the second pulse has appeared on the line C1, the output of the shift register 67 is shifted to the terminal "2" so that those of the AND elements 84—87 which are connected to those of the flip-flops 59—62 which produce a set output, produce an output. In the illustrated embodiment, it has been assumed that the flip-flops 59, 60 and 62 produce an output, so that a signal appears on the lines D1, E1 and G1. It is recalled that these signals express the coded name of the station where the ticket was used for entrance. The signals are then applied through the OR elements 107—110 to the recorder, which records the name of that station.

Upon completion of the recording, the recorder 104 produces a third output signal on the lines C1—C*n*. As previously mentioned, the third signal on the line C1 causes signals to appear on the lines E1 and F1, in the illustrated embodiment, to be applied through the OR elements 108 and 109 to the recorder, which records the name of the station where the ticket is used for exit.

When the recording of all the necessary information has thus been completed, the recorder produces a fourth signal on the lines C1—C*n*. This signal causes the resetting of the flip-flops 59—62 and 65 and the shift register 67.

Having illustrated and described a preferred embodiment of the invention, it should be noted that there are many changes and modifications thereof within the scope of the invention as defined in the appended claims. For example, the recorder 104 may include or be replaced by a computer to enable calculation of the fares. In the illustrated embodiment, the erasing of the name of the station where the ticket was used for entrance is conducted at the station where the ticket is again used for exit after the name of the station recorded on the ticket has been read. The erasing may be conducted at the station where the ticket is next used for entrance before the name of that station is recorded on the ticket. In such a case, erase head 38 at the exit gates may be replaced by an erase head 27′ at the entrance gates. Head 27′ may be disposed on arm 25 before head 27, and energized by the set output of flip-flop 23.

We claim:

1. An apparatus for automatically examining railway tickets to be used in any of a plurality of stations included in a railway line, each ticket having an identification code and an area for recording information thereon, comprising:

a. a plurality of ticket gates, at least one entrance ticket gate and one exit ticket gate being installed at each ticket station;
   1. each of said entrance ticket gates comprising means disposed therein for receiving and automatically recording on the ticket the name of the station at which said entrance ticket gate is located and means returning the ticket upon which the station name has been recorded to the passenger,
   2. each of said exit tickets gates comprising:
      i. means disposed at said exit ticket gate for receiving and automatically reading from a ticket the recorded station name thereon to produce a first corresponding electrical signal,
      ii. means for reading the identification code of said ticket to produce a second corresponding electrical signal,
      iii. means for providing a third electrical signal corresponding to the station name at which said exit ticket gate is located, and
      iv. means for providing an identification signal when a ticket has been received by said receiving means
b. a common controller,
c. transmission means connecting said plurality of entrance and exit ticket gates to said common controller
d. wherein said common controller comprises:
   1. scanning means providing a recognition signal to one of the said exit ticket gates which provides an identification signal, and
   2. a recorder
e. wherein each of said exit ticket gates further includes gating means coupling said first, second and third electrical signals to said recorder through said transmission means in response to said recognition signal.

2. An apparatus, as recited in claim 1, wherein each of said exit ticket gates includes means for erasing the station name recorded on said ticket immediately after said station name has been read by said reading means and said first corresponding electrical signal has been produced,

3. An apparatus, as recited in claim 1, wherein each of said entrance ticket gates includes means for erasing the station name on said inserted ticket immediately before said receiving means records the name of the station at which the entrance ticket gate is located.

4. An apparatus, as recited in claim 1, wherein each of said tickets includes a plurality of synchronizing marks which are disposed thereon adjacent the area for recording information, and said receiving and recording means of each of said entrance ticket gates includes:

a. means scanning said ticket and producing a plurality of pulses therefrom, one pulse being produced for each of said synchronizing marks,
b. a shift register stepped by said pulses,
c. means storing the station number in digital form,
d. means for recording a station number in the area for recording information on the ticket and, e. gating means sequentially coupling the digits of said station number to said recording means in synchronization with both said pulses and the outputs of said shift register.

5. An apparatus as recited in claim 1 wherein each of said tickets includes a plurality of synchronizing marks which are disposed thereon adjacent the area for recording information and said receiving and reading means of each of said exit ticket gates comprises:

a. means scanning said ticket and producing a plurality of pulses, one pulse being produced for each of said synchronizing marks, b. a shift register stepped by said pulses, c. means for reading the information recorded in the area of said ticket adjacent said synchronizing marks, d. storage means, and e. gating means coupling the station number recorded in said area to said storage means in synchronism with the output pulses provided by said shift register to thereby produce said first electrical signal.